(12) United States Patent
Byers et al.

(10) Patent No.: US 7,110,679 B2
(45) Date of Patent: Sep. 19, 2006

(54) INSTALLATION OF PROCESSING UNITS INTO A STORED PROGRAM CONTROLLED SYSTEM WHEREIN THE COMPONENT PROCESSING UNITS ARE INTERCONNECTED VIA FREE SPACE OPTICS

(75) Inventors: Charles Calvin Byers, Aurora, IL (US); Daniel Raymond Hatcher, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 809 days.

(21) Appl. No.: 09/932,707

(22) Filed: Aug. 17, 2001

(65) Prior Publication Data

US 2003/0035180 A1 Feb. 20, 2003

(51) Int. Cl.
*H04B 10/00* (2006.01)
(52) U.S. Cl. .................................... 398/164
(58) Field of Classification Search ........ 398/118–131, 398/164
See application file for complete search history.

(56) References Cited

U.S. PATENT DOCUMENTS

| | | | |
|---|---|---|---|
| 5,170,269 A | 12/1992 | Lin | 359/9 |
| 5,204,866 A | 4/1993 | Block | 372/27 |
| 5,245,680 A | 9/1993 | Sauter | 385/24 |
| 5,475,520 A | 12/1995 | Wissinger | 359/172 |
| 5,500,523 A * | 3/1996 | Hamanaka | 250/216 |
| 5,777,768 A | 7/1998 | Korevaar | 359/172 |
| 5,790,291 A | 8/1998 | Britz | 359/159 |
| 6,052,498 A | 4/2000 | Paniccia | 385/14 |
| 6,239,888 B1 | 5/2001 | Willebrand | 359/118 |

FOREIGN PATENT DOCUMENTS

| | | |
|---|---|---|
| EP | 0811862 A2 | 6/1997 |
| EP | 0876019 A2 | 2/1998 |
| EP | 1054520 A1 | 11/2000 |
| EP | 1079550 A1 | 2/2001 |
| GB | 2334396 A | 8/1999 |

OTHER PUBLICATIONS

IEEE Photonics Technology Letters, vol. 5, No. 7, Jul. 1993, pp. 825-828.
Electronics Letters, vol. 30, No. 16, Aug. 1994, pp. 1323-1324.
Toshikazu, Sakano, et al; "Three-Dimensional Board-toBoard Free-Space Optical Interconnects and Their Application To The Prototype Multiprocessor System: Cosine-III" Applied Optics, Optical Society of America, Washington, D.C.; vol. 34, No. 11; Apr. 10, 1995; pp. 1815-1822, XP000497507; ISSN: 0003-6935.

* cited by examiner

*Primary Examiner*—Agustin Bello

(57) ABSTRACT

Internal communication signals in a stored program controlled system comprising a plurality of units configured to process signals are provided by an optical beam line which is proximal to all of the plurality of units. The beam line is configured to contain optically encoded signals, which comprises signals transmitted between and/or among the plurality of units. Each unit includes a probe for injecting optically encoded signals in the beam line and/or and for receiving optically encoded signals from the beam line. Processing units include at least one aperture for passage of the beam line. Processing units may also include a movable portion that is moved during installation of the processing unit and then replaced after the main body is in place.

19 Claims, 11 Drawing Sheets

INSTALLATION OF PROCESSING UNITS INTO A STORED PROGRAM CONTROLLED SYSTEM WHEREIN THE COMPONENT PROCESSING UNITS ARE INTERCONNECTED VIA FREE SPACE OPTICS

CROSS-REFERENCE TO RELATED APPLICATIONS

This application is related to U.S. patent application Ser. No. 09/932,703 C. C. Byers, entitled "Interconnecting Processing Units of a Stored Program Controlled System Using Free Space Optics", filed concurrently herewith and commonly assigned to Lucent Technologies Inc., and incorporated by reference herein, with priority claimed for all commonly disclosed subject matter.

This application is also related to U.S. patent application Ser. No. 09/932,704 C. C. Byers, entitled "Interconnecting Processing Units Of A Stored Program Controlled System Using Time Division Multiplexed Free Space Optics", filed concurrently herewith and commonly assigned to Lucent Technologies Inc., and incorporated by reference herein, with priority claimed for all commonly disclosed subject matter.

This application is also related to U.S. patent application Ser. No. 09/932,705 C. C. Byers, entitled "Interconnecting Processing Units Of A Stored Program Controlled System Using Wavelength Division Multiplexed Free Space Optics", filed concurrently herewith and commonly assigned to Lucent Technologies Inc., and incorporated by reference herein, with priority claimed for all commonly disclosed subject matter.

This application is also related to U.S. patent application Ser. No. 09/932,706 C. C. Byers, entitled "Interconnecting Processing Units Of A Stored Program Controlled System Using Space Division Multiplexed Free Space Optics", filed concurrently herewith and commonly assigned to Lucent Technologies Inc., and incorporated by reference herein, with priority claimed for all commonly disclosed subject matter.

FIELD OF THE INVENTION

This invention relates to the field of stored program controlled systems, including, but not limited to, telephone switching offices, data routers, and robotic machine tools; and, more specifically, this invention describes installation of processing units of a stored program controlled system when the processing units are interconnected by an optical communication path.

BACKGROUND OF THE INVENTION

The background of the present invention may be summarized in one word: "wires". Most stored program controlled systems of even minor complexity consist of a plurality of single or limited functionality processing units, each of which is connected to one or more of the other processing units by wires. There are literally millions of miles of interconnecting wires in current use in systems as diverse as stored program controlled telephone and data switching systems, robotic assembly lines, high speed mainframe computers, modern aircraft, local area networks, etc.

These wires provide the medium for communication signals among processing units to facilitate functionality of the whole. For example, a signal generated by a processing unit in the cockpit of an airplane is transmitted over a wire to a processing unit in the tail section to manipulate the tail control surfaces. Likewise, in a stored program controlled telephone switching office, a signal to connect a telephone call from one line to another is carried by wires interconnecting the processing units to which the telephone lines are connected.

In most stored program control systems, the "interconnecting wires" is a complex array of backplane wiring interconnecting processing units on cards, shelves of cards and cabinets of shelves. Each of these (card, shelf of cards, cabinet of shelves) may be considered a "processing unit", because cards and shelves of related tasks are usually wired together in functional units, and then generally wired together in a cabinet. Cabinets of large stored program controlled systems are interconnected by bundles of wires (cables). Thus, the interconnecting wires provide communications paths that enable the individual processing units of the stored program controlled system to interact, thus providing the functionality of the whole.

A single change in an individual processing unit of a stored program controlled system may cause literally thousands of interconnecting wires to be moved from one processing unit to another, or connected or reconnected in some fashion. These new connections must be carefully planned and executed by skilled craftspeople that make each connection and then test it. One minor error may cause a major malfunction.

Therefore, a problem in the art is interconnecting processing units in a stored program controlled processing system with extensive wiring which is difficult to install, maintain and modify.

SUMMARY OF THE INVENTION

This problem is solved and a technical advance is achieved in the art by a system and method that effects fast and efficient installation and modification of processing units in a stored program controlled system that uses free space optics to interconnect processing units. Communication signal paths are provided in a stored program controlled system comprising a plurality of units configured to process signals ("processing units") by a beam line in free space, proximal to each of the plurality of units. The free space beam line is configured to contain optically encoded communications signals that are transmitted between and among the processing units. Each processing unit includes a probe for receiving optically encoded signals from the beam line, and, advantageously, a probe for injecting optically encoded signals into the beam line. For purposes of this invention, a processing unit may be a frame or a board (sometimes called a "card" in the art) as are known in the art.

According to an exemplary embodiment of this invention wherein a processing unit comprises a frame, the frame includes an aperture for passage of the beam line. The frame includes a moveable or removable portion that is moved out of the way of the beam line while the frame is moved into position. After the frame is moved into position, the moveable portion is moved into its position relative to the frame. The moveable portion does not interfere with or block the beam line at any time. Advantageously, the frame includes a movable probe in the beam line that may be moved into an optimal position for sending or receiving optical signals in the beam line.

In another exemplary embodiment of this invention, a processing unit comprises a board having one or more apertures for passage of the beam line. The apertures are positioned such that the board does not block or interfere with the beam line at any time. Advantageously, the board includes a movable probe in the beam line that may be moved into an optimal position for sending or receiving optical signals in the beam line. In general, the principals of this invention may be applied to any processing unit that uses free space optics to interconnect processing units.

BRIEF DESCRIPTION OF THE DRAWINGS

A more complete understanding of this invention may be obtained from a consideration of the specification taken in conjunction with the drawings, in which.

DETAILED DESCRIPTION

Figure 1:
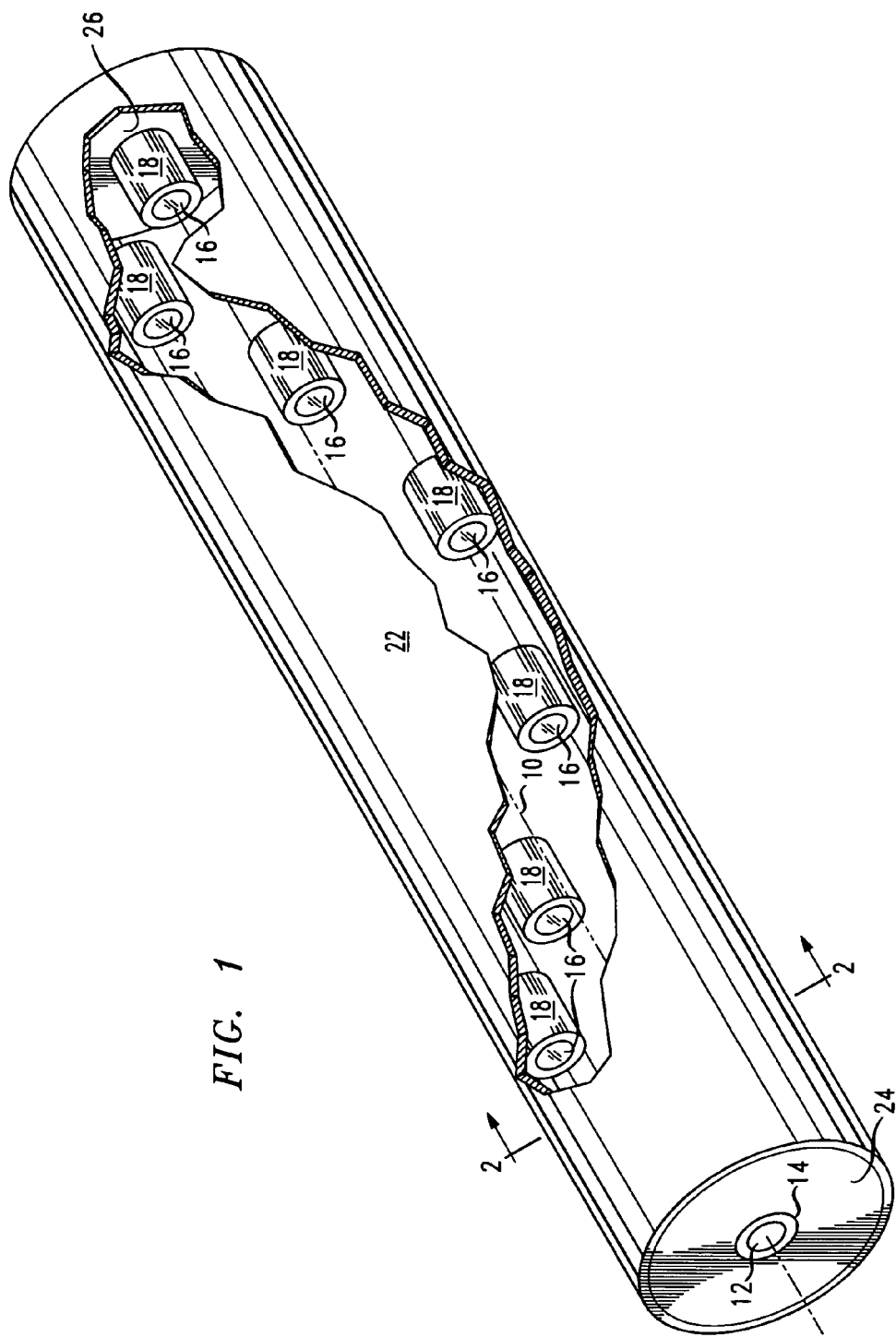
FIG. 1 is a perspective view of a free space beam line illustrating the relationship of the beam line and probes according to a general overview of an exemplary embodiment of this invention.

Turning to FIG. 1, a perspective view of a free space beam line 10 according to one exemplary embodiment of this invention is shown. According to this exemplary embodiment, a free space beam line 10 is generated by a transmitter 12 within a transmitting probe 14 which projects optically encoded signals, as will be described below in connection with FIGS. 3 and 4. Transmitting probe 14 produces a beam line 10 of desired diameter along the length of its path.

A plurality of receivers 16 within receiving probes 18 are distributed throughout beam line 10 along the outer periphery in the form of a spiral or helix, in this exemplary embodiment. Other possible configurations of probes along the beam line will be apparent to one skilled in the art after studying this disclosure. Receiving probes 18 are distributed in a helix in this exemplary embodiment so that there is a minimal amount of shadowing; that is, one receiving probe 18 being in the shadow of a previous receiving probe 18 in beam line 10 causing the probe in the shadow to receive little or none of the optically encoded signals in beam line 10.

Free space beam line 10 may be contained within a reserved volume or conduit 22 in an enclosure, such as a cylinder or pipe or, alternatively, may be in the open. If the beam line 10 is contained in a conduit, then the interior surface may be optically absorptive or optically reflective depending upon the length of the pipe, the wavelength of the signal generated by the laser within transmitter 12 and loss budget to provide optimal reception of optically encoded signal by the plurality of receiving probes 18 throughout the length of beam line 10.

Conduit 22 includes, in this exemplary embodiment, a first terminal unit 24 and a second terminal unit 26. First terminal unit 24 includes a transmitting probe 14 and second terminal unit 26 includes a receiving probe 18, in this exemplary embodiment. First terminal unit 24 originates optical beam line 12 and second terminal unit 26 terminates the portion of optical beam line 12 passing beyond the other probes 18. As will be discussed further, below, first terminal unit 24 and/or second terminal unit 26 may include both transmitters and receivers, and may be interconnected to recycle the encoded signal.

Figure 2:
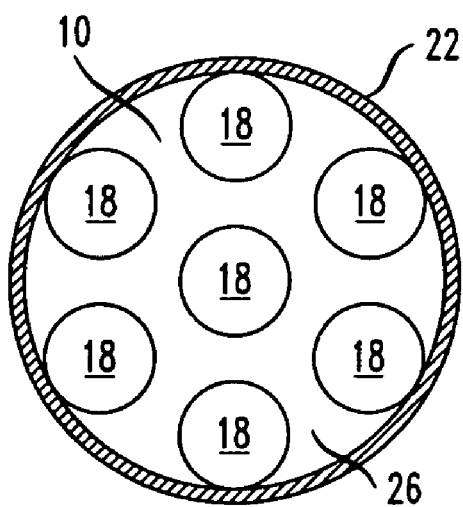
FIG. 2 is a cross-sectional view of the free space beam line taken along line 2—2 of FIG. 1.

FIG. 2 illustrates a view looking down a cross-section of free space beam line 10 taken along line 2—2 of FIG. 1. Conduit 22 includes a plurality of receiving probes 18 around its inner edge. In the illustration of FIG. 2, the laser of transmitter 12 (FIG. 1) focuses beam line 10 to encompass the interior circumference of conduit 22 whereby each probe 18 receives the encoded optical signal. Second terminal unit 26 is illustrated herein as comprising a receiving probe 18. (Second terminal unit may also include a transmitter 12, not shown.) Alternatively, second terminal unit 26 may comprise an end cap. An end cap may be absorptive in order to stop the beam line 10 or may be reflective (i.e., a mirror or reflector) to recycle beam line 10 in the opposite direction.

Figure 3:
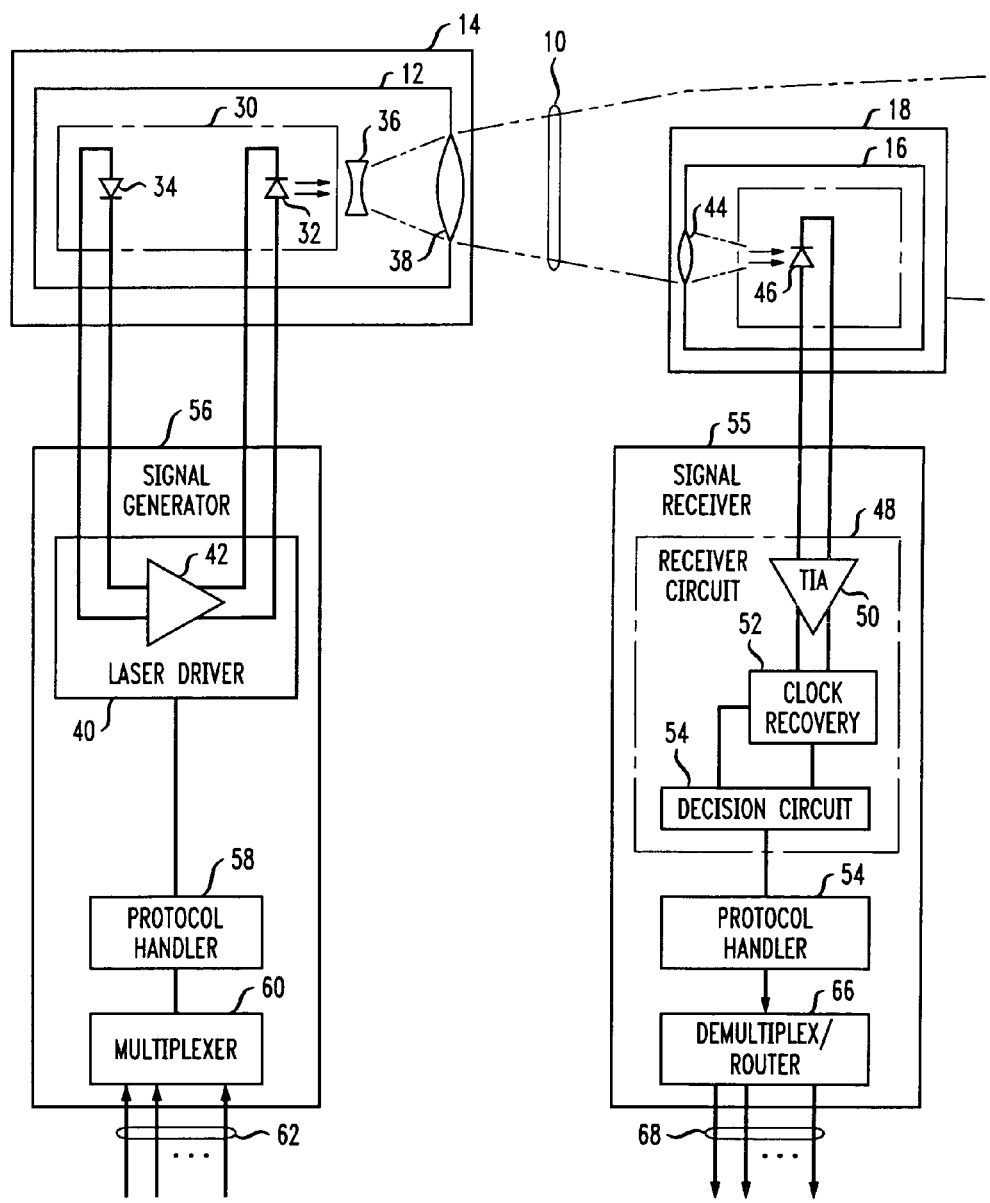
FIG. 3 is an exemplary embodiment of transmitting and receiving probes of FIGS. 1 and 2.

Turning now to FIG. 3, exemplary embodiments of a transmitting probe 14 and a receiving probe 18 are shown. In this exemplary embodiment, transmitting probe 14 includes a transmitter 12 comprising a laser 30 (i.e., a laser diode 32 and a feedback photo detector 34, as known in the art), which converts electronically encoded signals into free space optical beam line 10. Free space optical beam line 10 is projected through a concave lens 36 and a convex lens 38 (which form a reverse Galilean telescope, as is known in the art). A laser driver 40 feeds electrically encoded signals to, and receives feedback from, laser 30, as known in the art. Feedback amplifier 42 regulates the input to laser 30. Laser 30 and laser driver 40 are both known to those skilled in the art. Laser 30 and laser driver 40 are illustrated herein as two separate units, but may be one unit.

Free space beam line 10 is received at a receiving probe 18 at a receiver 16, which includes a convex lens 44 that focuses beam line 10 on a photo detector 46. Photo detector 46 receives a portion of beam line 10 and generates an electrical signal in response thereto. The electrical signal is fed into a receiver circuit 48 comprising a trans-impedance amplifier (TIA) 50, clock recovery circuit 52 and decision circuit 54. Receiver 16 and receiver circuit 48 are well known in the art. Receiver 16 and receiver circuit 48 are illustrated herein as two separate units, with receiver driver 48 contained within a signal receiver 55. However, these two units may be one unit, as is known in the art.

Laser 30 is driven by an electrical signal from signal generator 56. Signal generator 56 comprises laser driver 40, protocol handler 58 and multiplexer 60. Multiplexer receives multiple inputs 62 from one or more processing units, which are multiplexed according to a predetermined algorithm (many algorithms for multiplexing are known in the art and are thus not discussed here). Signals are then passed to protocol handler 58. Protocol handler 58 encapsulates the signals with the protocol used by the beam line 10. Such protocols are described in U.S. patent applications Attorney Docket Nos. Byers 41-3, Byers 42-4 and Byers 43-5 which are incorporated by reference, above. The signal generated by protocol handler 58 is fed into laser driver 40, which controls laser 30.

When photo detector 46 receives a signal, it is delivered to signal receiver 55, which comprises receiver circuit 48, protocol handler 64 and demultiplexer/router 66. The received signal is decoded in receiver circuit 48, as known in the art. The receiver circuit 48 is connected to a protocol handler 64, which de-encapsulates the signal received according to the protocol used by protocol handler 58. Protocol handler 64 passes the signal to a demultiplexer and router 66, which demultiplexes the signal and then sends, signals 68 to the receiving processing unit or units.

Figure 4:
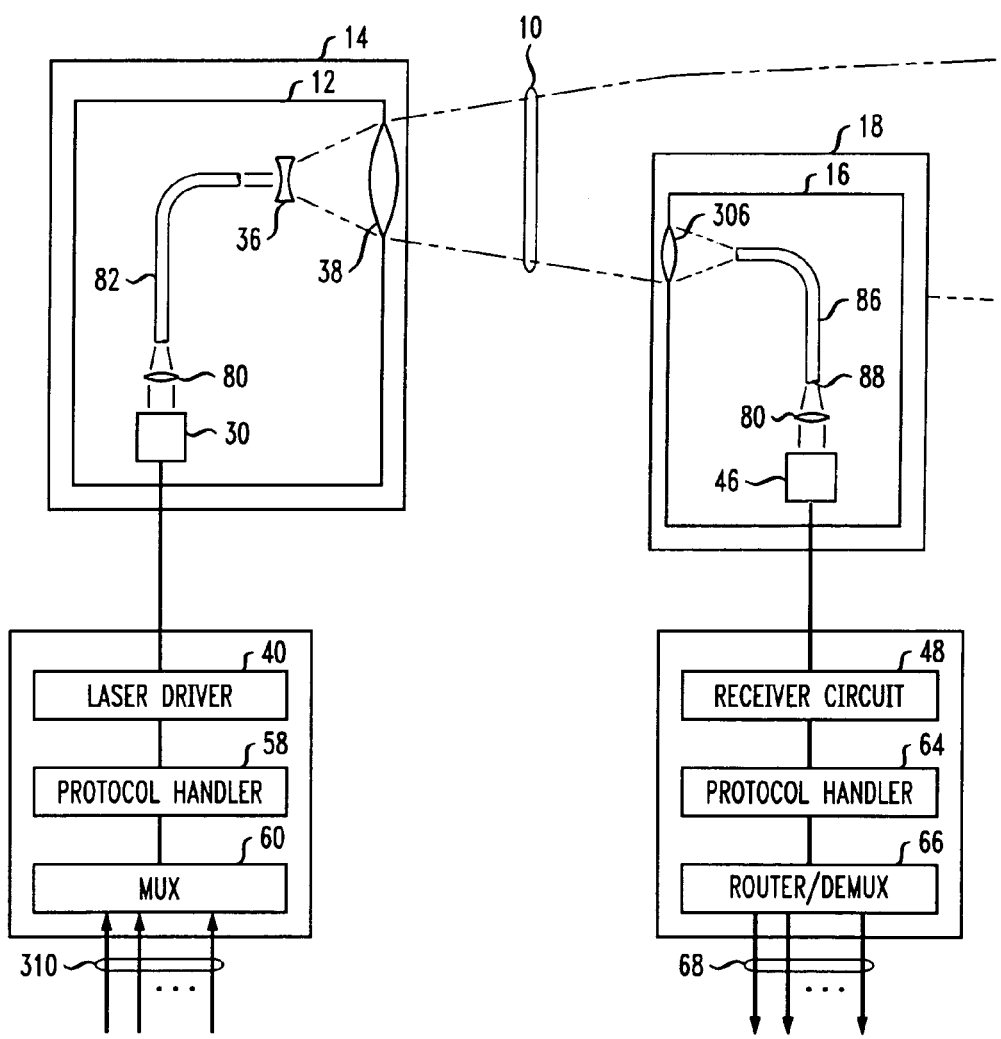
FIG. 4 is another exemplary embodiment of transmitting and receiving probes of FIGS. 1 and 2.

FIG. 4 illustrates an exemplary embodiment of a transmitting probe 14 and a receiving probe 18 according to another aspect of this invention. In this exemplary embodiment, the electronics are remote from the optical beam line. Transmitting probe 14 in this exemplary embodiment includes a transmitter 12 comprising a laser element 30, as described above in connection with FIG. 3, which changes electrical signals delivered from laser driver 40 into an optically encoded signal. Optionally, this optically encoded signal is fed into lens 80, which projects the signal through light guide 82 (i.e., optical fiber) in this exemplary embodiment. One skilled in the art will appreciate that some applications will not require lens 80. Fiber optic conduit 82 projects the optically encoded signal through lenses 36 and 38 (the reverse Galilean telescope as described above) which forms free space beam line 10.

Receiving probe 18 includes a receiver 16, a lens 306 that focuses light from beam line 10 onto fiber optic conduit 86. Fiber optic conduit 86 transmits the optical signal through lense 88 onto photo detector 46. Photo detector 46 sends an electrical signal through receiver circuit 48, protocol handler 64 and demultiplexer/router 66, as described above. The signals are delivered to their respective processing unit or units via lines 68.

Figure 5:
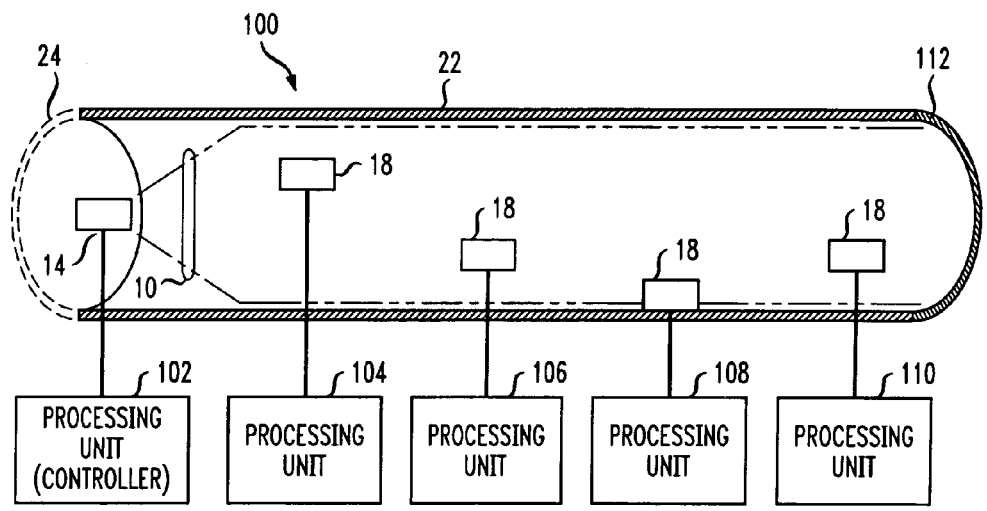
FIG. 5 is a block diagram of uni-directional communication along a free space beam line according to one exemplary embodiment of this invention.

FIG. 5 is a block diagram of a stored program controlled system 100 in a basic implementation of an exemplary embodiment of this invention. Stored program controlled system 100 may comprise, in this exemplary embodiment, a uni-directional local area network. In the stored program controlled system 100, a first processing unit 102 comprises a controller, which distributes signals to a plurality of processing units 104, 106, 108 and 110. Processing units 104, 106, 108 and 110 receive signals from controller 102 via receiving probes 18 (as described above) and perform their respective functions on received signals.

In this one-way communication system, processing unit (controller) 102 passes commands to processing units 104, 106, 108 and 110 without expecting responses from any of the processing units. Controller 102 generates signals to control processing units 104, 106, 108 and 110 and encodes the signals into a form that can be translated into optical signals (as discussed above in connection with FIGS. 3 and 4). Controller 102 is connected to a transmitting probe 14 in a first terminal unit 24 in this exemplary embodiment.

A free space beam line 10 is thus formed containing the optically encoded signals for processing units 104, 106, 108 and 110. The exemplary embodiment of FIG. 5 includes a conduit 22. Conduit 22 includes an end cap 112 (instead of a second terminal unit) which may be coated with light absorptive or alternatively reflective material, depending upon which direction the receiving probes 18 are facing.

According to this invention, the entirety of free space beam line 10 is filled with optically encoded signals as it exits terminal unit 24. In this embodiment, each probe receives the optically encoded signal directly. Alternatively, lenses 36 and 38 in transmitter 12 (FIG. 3) of transmitting probe 14 may focus the beam line 10 so that it does not completely fill conduit 22 until it hits end cap 112. End cap 112 comprises reflective surface in this exemplary embodiment, which provides a full beam line 10 throughout conduit 22. Considerations of signal strength, beam divergence, bit rate, distance between processing units 104, 106, 108 and 110, signal to noise ratio, etc. must be taken into account to determine which method (direct or reflective) of transmission is preferable in a given application.

Figure 6:
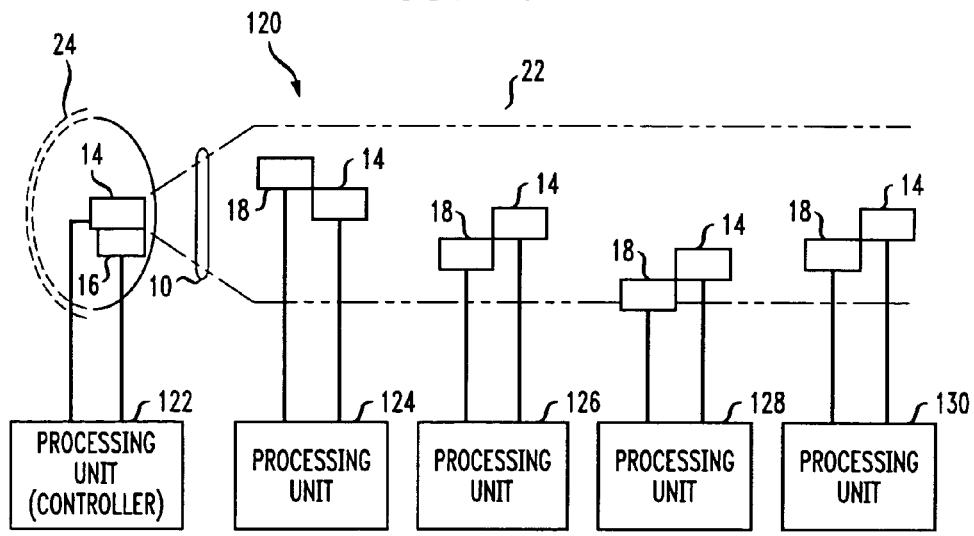
FIG. 6 is a block diagram of a further exemplary embodiment of this invention having bi-directional probes.

Turning now to FIG. 6, an exemplary embodiment of this invention using bi-directional probes is shown generally at 120. In this exemplary embodiment, processing unit (controller) 122 communicates with a plurality of processing units 124, 126, 128, and 130. As in the previous exemplary embodiments, controller 122 communicates with a first terminal unit 24, which includes a transmitting probe 14 that produces free space beam line 10. Beam line 10 is, in this exemplary embodiment, unenclosed.

Each processing unit 124, 126, 128 and 130 has an associated receiving probe 18 for receiving signals from controller 122. Additionally, each processing unit 124, 126, 128 and 130 includes a transmitting probe 14 to transmit return signals to receiving probe 16 in terminal unit 24. The received signals (feedback) are delivered to controller 122, which then processes these signals for further control of the stored program controlled unit.

Figure 7:
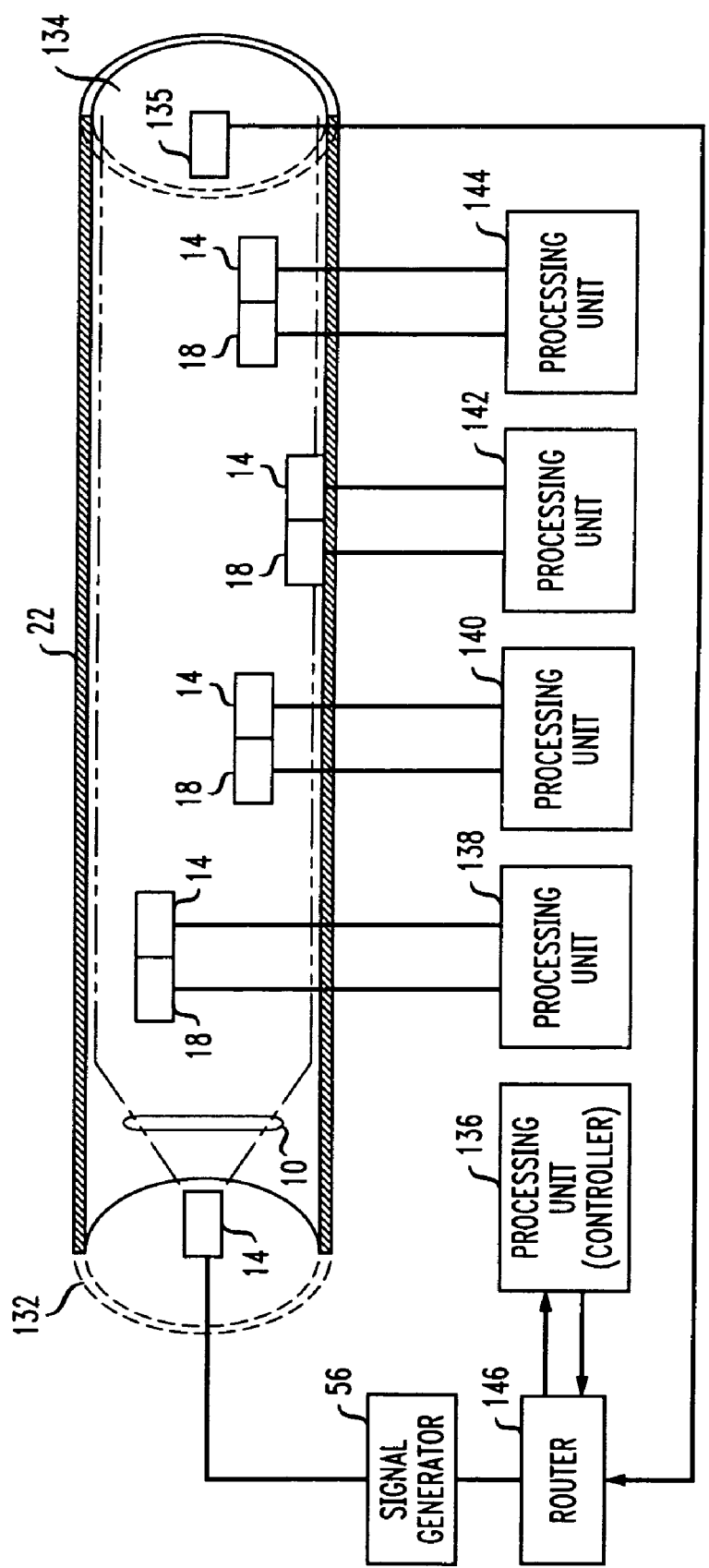
FIG. 7 is a block diagram of another exemplary embodiment of this invention wherein each of the processing units may communicate with each other.

Turning now to FIG. 7, a further exemplary embodiment of this invention is shown. In this exemplary embodiment, free space beam line 10 is unidirectional, i.e., signals flow in the direction from uni-directional first terminal unit 132 to second uni-directional terminal unit 134, which uses receive terminal probe 135, and are then recirculated, as will be described further below. Free space beam line 10 is enclosed in conduit 22. In this exemplary embodiment, a processing unit controller 136 and processing unit 138, 140, 142 and 144 are each connected to a respective transmitting probe 14. Processing units 138, 140, 142 and 144, as well as second unidirectional terminal unit 134 are connected to respective receiving probes 18.

In the exemplary embodiment of FIG. 7, processing unit or controller 136 originates electrical control signals for processing units 138, 140, 142 and 144 and communicates such signals to router 146. Router 146 comprises a conventional router as is known in the art. Router 146 communicates signals for processing units 138, 140, 142 and 144 to a signal generator 56 (as described above in connection with FIG. 3). Transmitter 14 in unidirectional first terminal unit 132 optically encodes the signals, and transmits optical beam line 10. Receiving probes 18 receive the optically encoded signals, decodes them and convey them to their respective processing unit 138, 140, 142 and 144. Each processing unit 138, 140, 142 and 144 may send feedback or other information to controller 136 by injecting signals into free space beam line 10, which are all received at terminal receiving probe 135 in uni-directional second terminal unit 134. The signals are then fed back to router 146 where they may be further circulated in beam line 10 or delivered to controller 136.

Systems using many of the embodiments of this invention (i.e., FIG. 7) must include features to prevent messages from recirculating in the free space beam line 10. If these features are not included, infinite feedback loops are possible, where a single message is continuously relayed between two endpoints and/or probes, quickly absorbing all available bandwidth. To prevent this, a means to break these loops is provided. Router 146 is programmed (or programmed in conjunction with the probes or endpoints) to detect addresses that lead to looping and not forward those messages back into the beam line. Alternately, the optical characteristics of the beam line, transmitters and receivers are controlled to prevent messages from a given source from circulating indefinitely.

Figure 8:
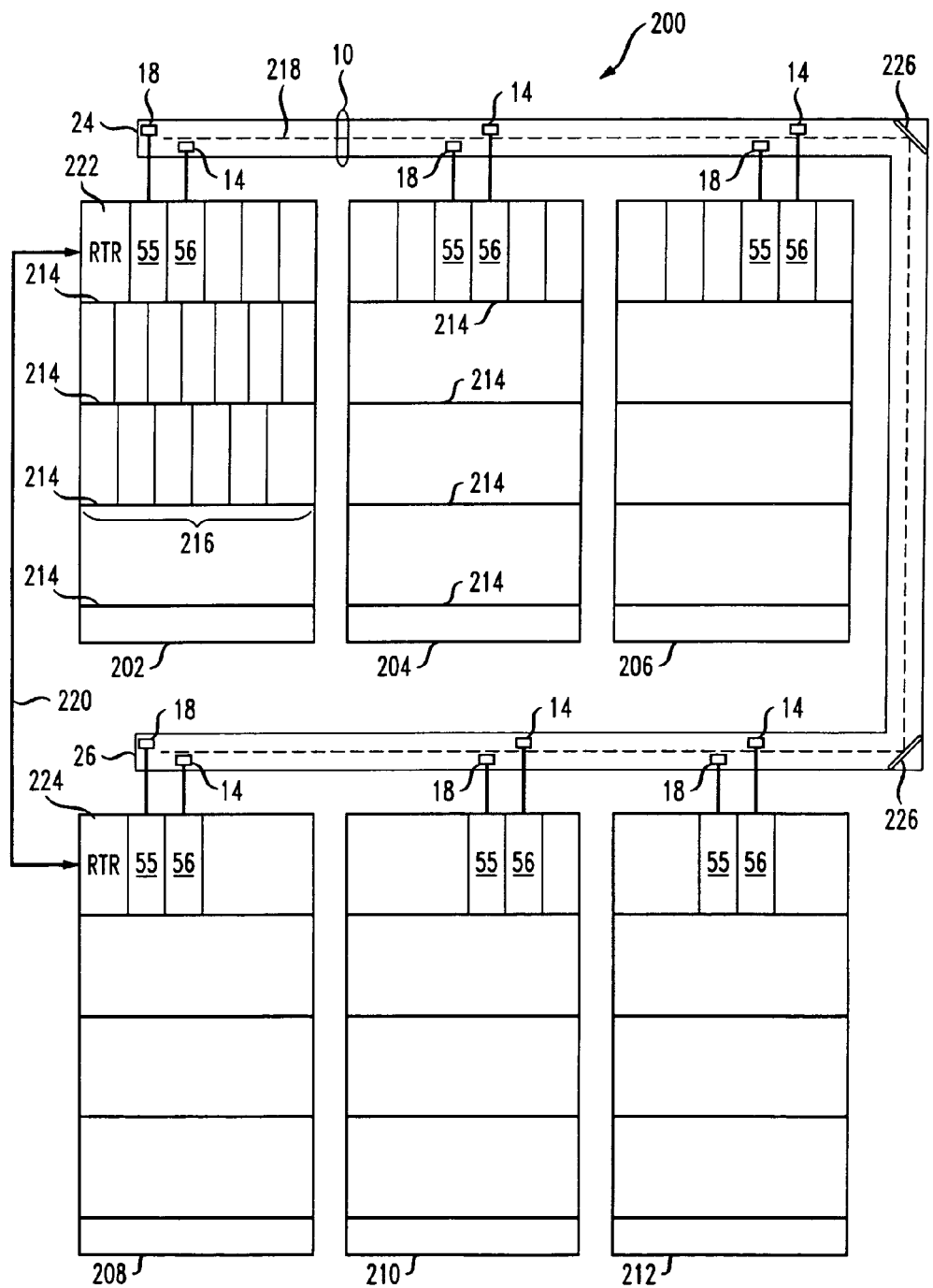
FIG. 8 is a physical layout of a stored program controlled switching office according to an exemplary embodiment of this invention.

FIG. 8 presents a block diagram of one exemplary embodiment of a stored program controlled system, which uses a free space optical beam line 10 to interconnect its processing units and other optical components. In this exemplary embodiment, the stored program controlled system comprises a telephone switching system 200, such as a 5ESS® Switch or 7R/E Switch manufactured by Lucent Technologies. There are a plurality of processing units 202, 204, 206, 208, 210 and 212. Processing units 202, 204, 206, 208, 210 and 212 comprise "frames" as are known in the art. Each frame comprises a plurality of shelves 214 and on each shelf is one or more cards 216 (also called "boards" in the art). Each card 216 performs one or more predefined functions, as is known in the art.

In the exemplary embodiment of a 5ESS® Switch, frame 202 comprises a communications module (CM) which effects communication among the other frames in the system. Frame 204 comprises an administration module (AM) which provides overall control of the system and human-machine interface. Frames 206, 208, 210 and 212 comprise switch modules (SMs), which support a plurality of line and/or trunk units (or some combination thereof) and effect connections of telephone or data calls. All of the processing units (frames 202, 204, 206, 208, 210 and 212) communicate with each other (generally through CM 202) in order to switch telephone calls.

Currently, frames such as 202, 204, 206, 208, 210 and 212 are interconnected by a plurality of wire buses and/or optical fiber carried in overhead trays or under raised floors. Wiring a new office or even adding a new frame may cause the installation team to revisit the entire wiring of the system in order to ensure proper functionality of the whole stored program controlled system 200 when connected. This invention is intended to replace the current industry standard of wiring between and among frames in central switching offices. This invention eliminates the probability of accidental damage to cabling, decreases new installation and upgrade time. The following exemplary embodiment of this invention is described in the context of such a central switching office. It is, however, clear to one skilled in the art how to implement and use this invention in other applications after a review of this patent application.

According to one exemplary embodiment of this invention, a free space optical beam line 10 provides interconnection of the frames 202, 204, 206, 208, 210 and 212. Signals are carried on one or more optical wavelengths as is known in the art. There may also be a pilot beam 218 in the visible light wavelengths in order to aid craft personnel to align probes 14 and 18 of the processing units.

In this exemplary embodiment, each processing unit 202, 204, 206, 208, 210 and 212 includes a transmitting probe 14 and a receiving probe 18 positioned in beam line 10 in order to send and receive, respectively, signals in system 200. Each transmitting probe 14 and each receiving probe 18 may, advantageously, be bi-directional. It is within the scope of one skilled in the art to make the transmitting and receiving probes of FIGS. 3 and 4 transmit/receive in both directions after reading this specification. Transmitting probe 14 and receiving probe 18 on frame 202 comprise a first terminal unit 24 and transmitting probe 14 and receiving probe 18 on frame 208 comprise a second terminal unit 26. The probes 14 and 18 in first terminal unit 24 and second terminal unit 26 may he uni-directional.

Each transmitting probe 14 is connected to a signal generator 56 and each receiving probe 18 is connected to a signal receiver 55. Signal generator 56 and signal receiver 55 may be separate cards 216 as illustrated, may be one integrated card, or may both be integrated with other functionality of its respective shelf 214 and/or frame 202, 204, 206, 208, 210 or 212.

Additionally, first terminal unit 24 may be connected to second terminal unit 26 by way of a connector 220. Routers 222 and 224 are illustrated herein as connecting connector 220 to first terminal unit 24 and second terminal unit 26, respectively. Ordinary routers 222 and 224 route selected messages between terminal units 24 and 26, and to prevent endless looping of messages. Connector 220 may comprise another free space optical conduit like beam line 10, or may comprise a fiber optic or electrical link as is known in the art.

Free space beam line 10 may be manipulated by turning mirrors 226, prisms or the like (not shown but well known in the art) to provide, for example, a continuous beam line 10 through multiple rows of processing units (or floor levels, etc.). Beam line 10 is illustrated as running above the processing units in FIG. 1. Beam line 10 may also run under a raised floor, or in a space or conduit otherwise adjacent to or through the processing units.

Figure 9:
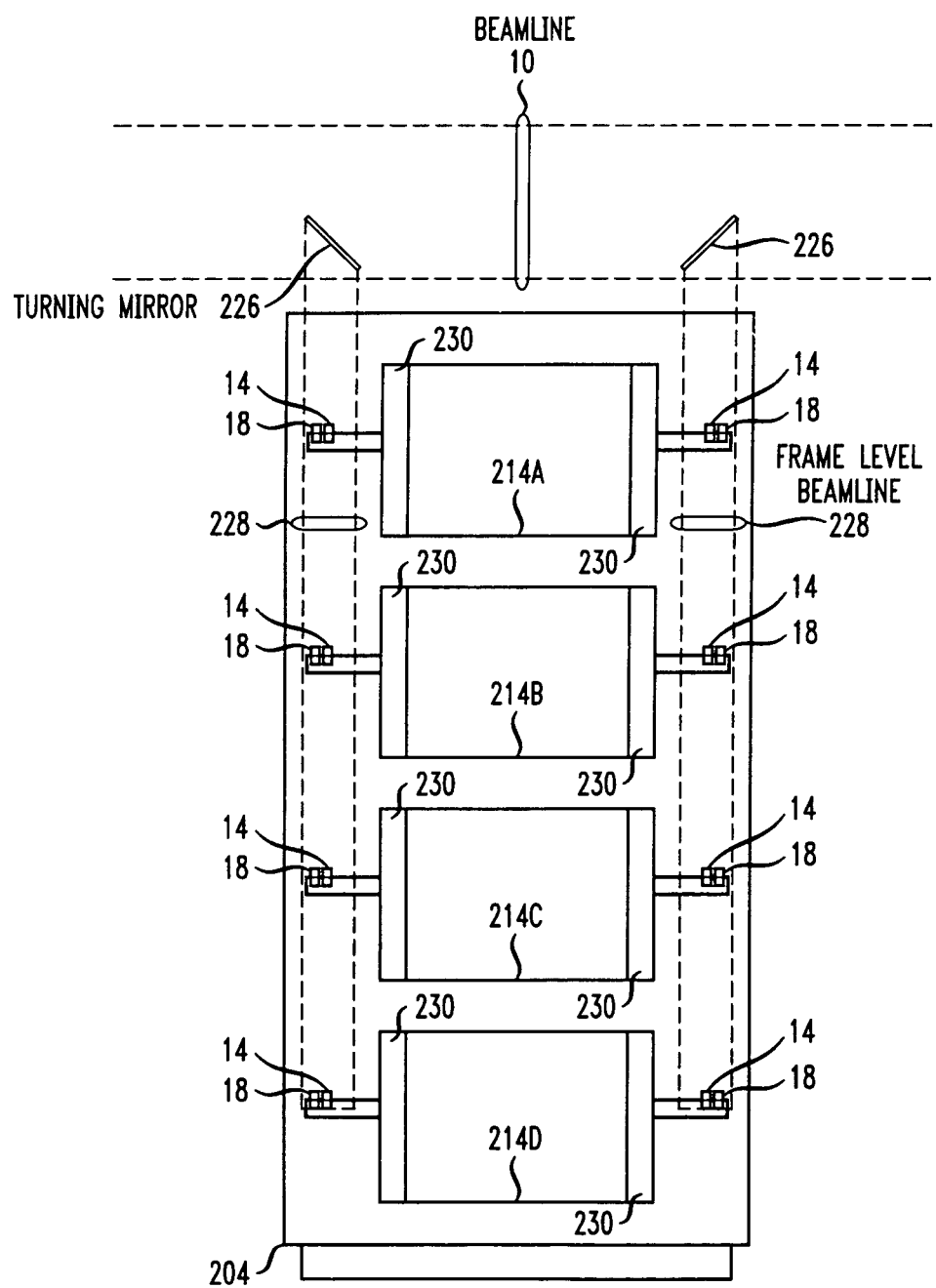
FIG. 9 is a block diagram of the exemplary embodiment of FIG. 8 in which the free space beam line is distributed to each shelf.

Turning now to FIG. 9, another exemplary embodiment of this invention is shown, wherein "processing units" are defined at one level below a frame. In this exemplary embodiment, free space beam line 10 is shown, as described above. Each frame, for example, frame 204, comprises a plurality of shelves 214, here shown as 214A–D. In this exemplary embodiment, a turning mirror 226 is set in main free space beam line 10 to turn main bean line 10 into frame-level free space beam lines 228. In this exemplary embodiment, transmitting probes 14 and receiving probes 18 send and receive optical signals for each shelf 214A–D. End cards 230 on each shelf 214A–D comprise signal generators 56 and signal receivers 55 (not shown) as described above in connection with FIG. 3. Mirrors 226 may be partially reflective so as to turn a portion of the signal beams and allow another portion to pass through, as is known in the art.

Figure 10:
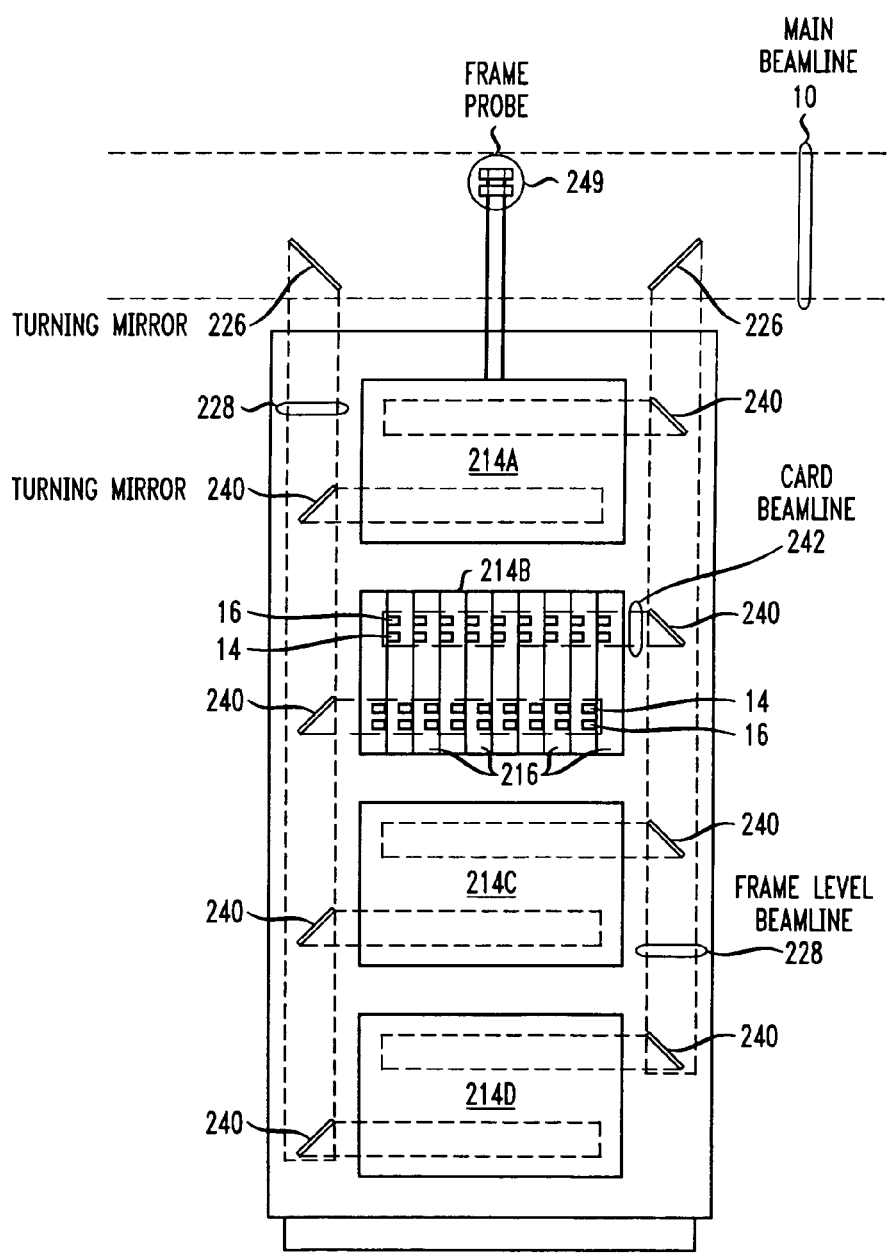
FIG. 10 is a block diagram of the exemplary embodiment of FIG. 8 in which the free space beam line is distributed to each card on each shelf.

Turning now to FIG. 10, another exemplary embodiment is shown, wherein a "processing unit" is defined as a card 21. Turning mirrors 226 are again used to turn main free space beam line 10 into frame free space beam lines 228. Each shelf 214A–214D includes a pair of additional card level turning mirrors 240 in free space beam lines 228, respectively. Card level turning mirrors 240 provide a card free space beam lines 242. There may be one or more card level beam lines 242 per shelf 214. In this exemplary embodiment, there are two free space beam lines 242 per shelf. Each shelf 214 then includes at least one board 216 equipped with a transmitting and/or receiving probes 14 and 18 (as illustrated in FIG. 3) and the supporting signal generator and signal receiver.

Frame probe 249 is used for frame-level communication and control functions. For example, power control, temperature sensing and alarm enunciation may be communicated to a central control by frame probe 249.

Figure 11:
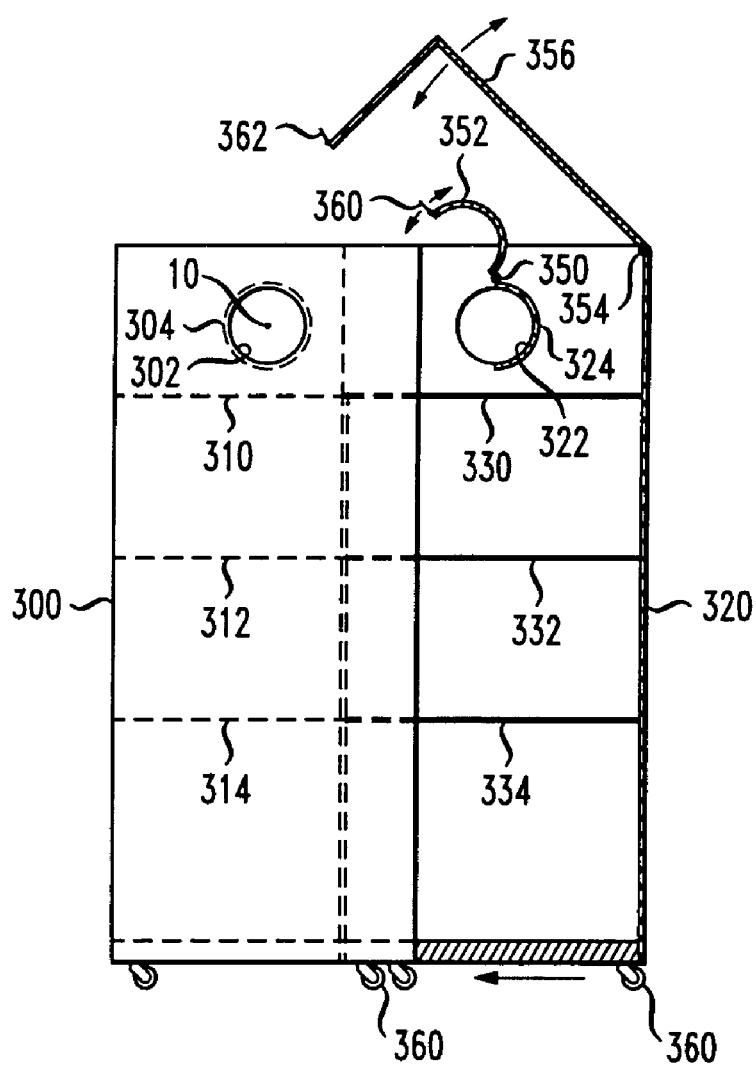
FIG. 11 is an exemplary embodiment of installation of a processing unit comprising a frame into an operating stored program controlled system according to an exemplary embodiment of this invention.

Turning now to FIG. 11, a block diagram of installation of a frame into a stored program controlled system that employs free space optical interconnect is shown. In this exemplary embodiment, beam line passes through frames 300. An in-place frame, such as frame 300 (shown in side view), includes an aperture 302 or passage in frame 300 for the beam line 10 in a conduit 304. In this exemplary embodiment, frame 300 includes shelves 310, 312 and 314 as are known in the art which house a plurality of cards providing functionality for a frame-level processing unit.

According to an exemplary embodiment of this invention, frame 320 is to be installed adjacent to frame 300. Frame 320 also includes an aperture for the optical interconnect 322 and a conduit 324. Frame 320 also includes shelves 330, 332 and 334 containing a plurality of cards (not shown but well known in the art). According to this exemplary embodiment, conduit 324 includes hinge 350 so that a portion of conduit 352 may move or swing upwardly. Further, frame 320 is also includes hinge 354 so that the top and a portion of the side, together denoted 356, may also swing upwardly. Frame 320 may then be pushed into alignment with frame 300 on casters 360, as known in the art, or some other method, such as skids.

Importantly, the installation of frame 320 does not block or interfere with the passage of the free space optical interconnect through channel 302. Once frame 320 is fully in place, and its probe(s) positioned in the beam line, moving conduit portion 352 may be swung downwardly and fastened into the body of conduit 324 by latch 360. Likewise, frame portion 356 may be swung downwardly and locked into and secured in position using latch 362. In this manner, a frame such as 320 may be added or removed without disrupting the operation of the stored program controlled system. Of course, hinges 350 and 354 are not necessary to this invention as the movable portions of the conduit 352 and the frame 356 may be removed for installation and then fastened in place.

Figure 12:
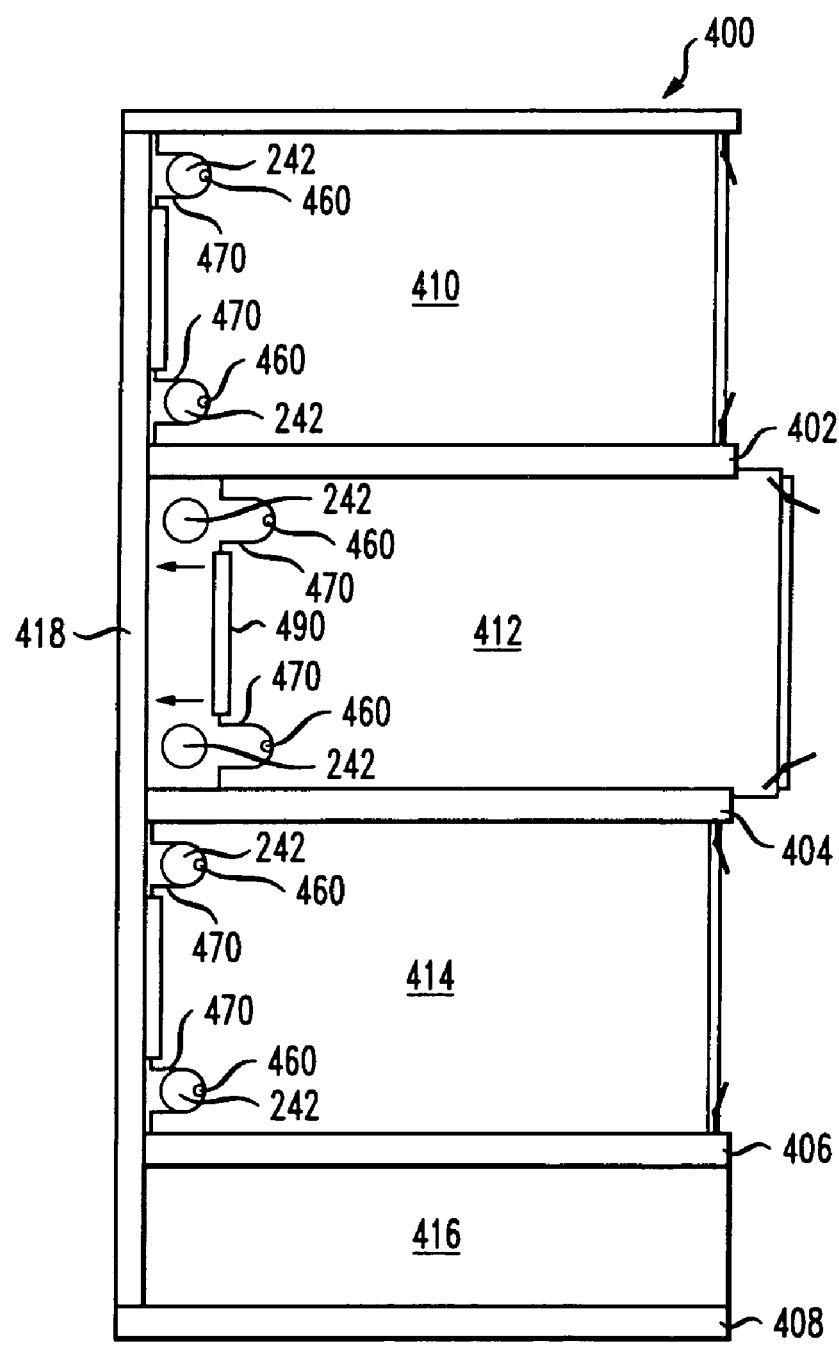
FIG. 12 is an exemplary embodiment of installation of a processing unit comprising a card.

Turning now to FIG. 12, another embodiment illustrating installation of a card according to this invention is shown. FIG. 12 illustrates a side view of a frame 400 comprising four shelves 402, 404, 406, 408 on each of which are one or more cards represented by cards 410, 412, 414, and 416. A backplane as is known in the art is on the back of the frame 418. There are two beam paths 242 for each shelf 402, 404, 406. Each card contains two probes 460 as described above in connection with FIGS. 3 and 4. In the embodiment of FIG. 12, probes 460 may be in one of many different positions around the beam line. According to this exemplary embodiment, there are notches 470 in each card to permit passage of free space beam line 242. Further, notches 470 permit cards such as 412 shown partially inserted to be removed or added without disturbing the beam line or the other cards. A connector 490 is shown on the back edge of board 412, which plugs into backplane 418 for communication up and down frame 400 as is known in the art. For example, power from shelf 408 may be transmitted through backplane 418. In this manner, a card may be added or removed without disrupting beam path 242 and thus facilitating installation and changing of operating unit boards without having to shut down the entire shelf or frame.

It is to be understood that the above-described embodiments are merely illustrative principles of the invention and that many variations may be devised by those skilled in the art without departing from the scope of this invention. It is, therefore, intended that such variations be included within the scope of the following claims.

What is claimed is:

1. A processing unit for use in a stored program controlled system comprising a plurality of processing units, wherein communication among said processing units is effected by a free space beam line configured to contain optically encoded signals transmitted among said plurality of processing units, said processing unit comprising:

an aperture for passage of said beam line configured to permit installation and removal of said processing unit without blocking said beam line; and means in said aperture connected to each of said plurality of units for receiving optically encoded signals from said beam line after installation of said processing unit.

2. A processing unit in accordance with claim 1 wherein said processing unit comprises a frame.

3. A processing unit in accordance with claim 2 wherein said processing unit including a removable portion so that said beam line is not blocked during installation.

4. A processing unit in accordance with claim 3 wherein said removable portion of said processing unit is configured to be replaceable after installation without blocking said beam line.

5. A processing unit in accordance with claim 2 wherein said processing unit comprises a board and said means for receiving optically encoded signals from said beam line is movable relative the board to optimally receive said optically encoded signals in said beam line.

6. A processing unit in accordance with claim 2 wherein said processing unit comprises a board and includes means for transmitting optically encoded signals into said beam line is movable relative the board to optimally transmit said optically encoded signals into said beam line.

7. A processing unit in accordance with claim 1 wherein said processing unit comprises a board.

8. A processing unit in accordance with claim 7 wherein said board includes a second aperture.

9. A processing unit in accordance with claim 8 wherein said board includes a second means for receiving optically encoded signals from a second beam line and is movable relative the board to optimally receive said optically encoded signals in said second beam line.

10. A processing unit in accordance with claim 7 wherein said means for receiving optically encoded signals from said beam line is movable relative the board to optimally receive said optically encoded signals in said beam line.

11. A processing unit in accordance with claim 1 wherein said processing unit includes a movable portion that moves relative to a remainder of the processing unit, the movable portion defining part of the aperture through which said beam line passes, the movable portion being adapted to occupy a first position during installation so that no portion of the beam line is blocked during the installation, the movable portion being adapted to occupy a second position after installation so that the movable portion in combination with the remainder of the processing unit defines the aperture that substantially surrounds the beam line.

12. A processing unit in accordance with claim 1 wherein said processing unit includes a board, said aperture formed at an edge of the board and configured to encircle a substantial portion but not all of said beam line when the board is installed.

13. The processing unit of claim 1 wherein said aperture receives the free space beam line as propagated in air prior to and after passing through said aperture.

14. A method for installing and removing processing units in a stored program controlled system comprising a plurality of processing units, wherein communication among said processing units is effected by a free space beam line configured to contain optically encoded signals transmitted among said plurality of processing units, said method comprising the steps of:
    providing an aperture in said processing unit; and
    installing said processing unit so that said beam line passes through said aperture;
    wherein said step of providing an aperture comprises:
    providing an aperture that does not block said beam line during said step of installing.

15. A method in accordance with claim 14 wherein said processing unit further includes a moveable portion, said step of providing an aperture that does not block said beam line during said step of installing comprising the sub steps of:
    moving said movable portion out of the way of said beam line during installation; and
    replacing said movable portion after installation.

16. A method in accordance with claim 14 wherein each processing unit includes a board and a movable probe, said method further including the step of aligning said probe in said beam line by moving the probe relative to the board.

17. A method in accordance with claim 14 wherein the step of installing further comprises the step of moving a portion of a structure that defines a portion of the aperture to a first position during installation so that no portion of the beam line is blocked during the installation, and moving said portion of the structure to a second position after installation so that said portion comprises part of the aperture that substantially surrounds the beam line.

18. A method in accordance with claim 14 wherein each processing unit includes a board and the step of installing further comprises the step of moving the board having an aperture disposed along an edge of the board to an installed position so that no portion of the beam line is blocked at any time during the installation, the aperture surrounding a substantial portion but not all of the beam line.

19. The method for installing and removing processing units of claim 14 further comprising the step of the free space beam line being propagated in air prior to entering said aperture and being propagated in air after passing through said aperture.

* * * * *